Nov. 16, 1926.

W. GAMACHE ET AL 1,606,873

WIRE CLAMP

Filed April 12, 1926

INVENTORS:
William Gamache,
Arthur J. Beaudry,
BY Harry W. Bowen.

ATTORNEY.

Patented Nov. 16, 1926.

1,606,873

UNITED STATES PATENT OFFICE.

WILLIAM GAMACHE, OF HOLYOKE, AND ARTHUR J. BEAUDRY, OF FAIRVIEW, MASSACHUSETTS.

WIRE CLAMP.

Application filed April 12, 1926. Serial No. 101,592.

This invention relates to improvements in wire clamps or retaining devices.

An object of the invention is to provide a device for permitting wire to be freely drawn through the clamp in one direction but will not permit the wire to be drawn in the opposite direction.

The present invention is particularly designed for use in wire mills where wire is wound on spools, of various sizes, to prevent it from moving backwards even to the slightest extent, when the coiling apparatus stops or is at a standstill.

A further object is to firmly clamp the wire when it is desired to cut off a definite length, as for example, the soft wire that is used in cores of magnetos and spark coils where it is very desirable that the wire be carefully cut to a definite length.

Broadly, it comprises a plurality of members which are connected together by threaded construction. Each of these members, is formed with an opening to receive a sleeve having a conical shaped or inclined surface on its interior surface, and, located within this sleeve is a movable or slidable member through which the wire to be clamped passes. This slidable member is formed with openings to receive a plurality of steel or hardened balls which engage the inclined surface of the sleeve for forcing the balls directly against the wire to clamp or grip the wire should it be moved in the opposite direction. A coiled spring is mounted on the movable member whose operation is normally to force the movable or slidable member and the balls against the inclined surface, but, when the wire is normally being drawn through the spring it is slightly compressed and the balls are free to roll on the wire.

Referring to the drawings:—

Figure 1:
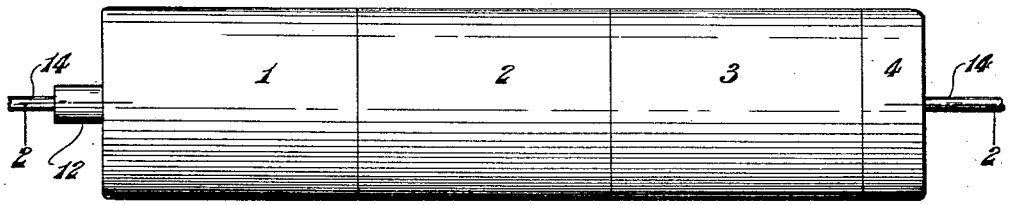
Fig. 1 is an external view of several of the sections secured together and illustrating a length of wire projecting from their opposite ends.
Figure 2:
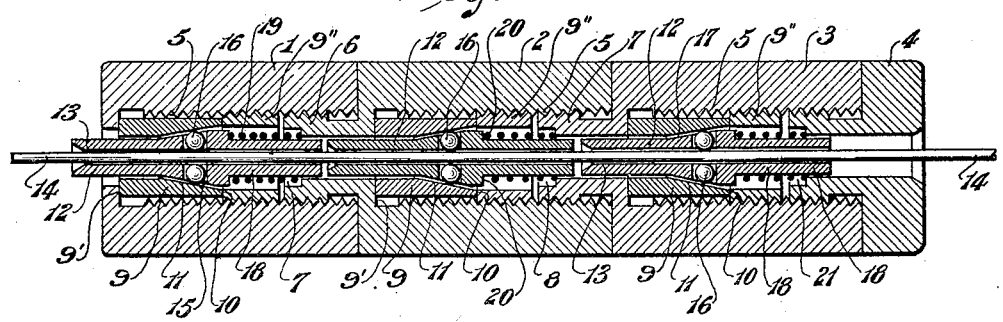
Fig. 2 is an enlarged longitudinal sectional view through the axis of the rod and sections showing the interior construction of the various parts of the clamp.
Figure 3:
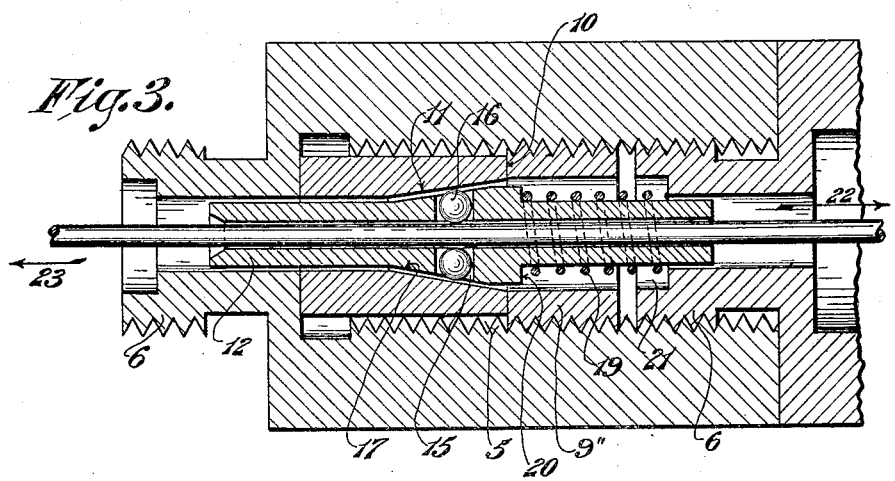
Fig. 3 is an enlarged detail view of one of the sections and the movable or slidable member.

Referring to the drawings in detail: 1, 2, and 3 represent three of the sections and 4 is the cap or closure end piece. Each of the pieces 1, 2, and 3 are internally threaded as indicated at 5. The pieces 1 and 2 are each formed with a threaded extension part 6 and 7 which engages the threads 5, and these parts are each formed with shouldered recesses 7 and 8. 9 designates sleeve members which are slipped into the sections and engage the shoulders 9'. They are retained in place by the threaded sleeves 9" with their inner ends resting against the ends 10. The sleeves 9 are each formed with an inner inclined or cone shaped surface 11. 12 designates the slidable or movable members which are located within the sleeves 9 and these members are formed with openings 13 to receive the wire 14. It is also formed with openings 15 preferably three, only two are shown and in which are located the steel balls 16. The slidable members 12 as shown are formed with cone shaped outer surfaces 17 that are subtantially parallel with the cone shaped surfaces 11 of the sleeves. 18 designates a cylindrical inner end portion of the members 12 and on these portions are placed the coiled expansion springs 19, one end of which is located in the shouldered recess 8 and the other against the shoulders 20. The cap portion 4 is threaded to engage the threads 5 and is formed with a shoulder recess 21 with which the spring 18 of the last slidable member engages.

The operation of the wire clamp is as follows: When the wire 14 is drawn in the direction of the arrow 22 the balls 16 freely roll on the wire since the spring 19 is then slightly compressed or inoperative and the balls are free from contact with the inclined surfaces 11 of the sleeves 9. Should the wire be moved in the opposite direction as indicated by the wire 23 the springs 19 will expand and move the members 12 toward the left bringing the balls 16 against the inclined surfaces 11. This will force the balls inward against the wire and firmly clamp the same against movement. It is desirable that three or more sections be employed to firmly retain the wire against movement. The wire 14 is preferably soft or annealed wire whereby the hardened balls will firmly grip the same.

It will be seen from this description that we have provided a very simple and effective means for clamping wire while being coiled or for retaining it while being cut into definite lengths.

What we claim is:

1. A wire clamping device in combination with an inclosing element having an opening therethrough and internally threaded, a movable member located in the opening, said member having an opening therethrough for receiving the wire to be clamped, the movable member having an inclined surface and formed with openings to receive wire gripping elements, a tapered surface with which the wire gripping elements cooperate and means for automatically moving the wire gripping elements against the tapered surface when the wire is moved in one direction and to permit it to freely pass through the movable element when moved in the opposite direction and means for retaining the movable member in the internally threaded enclosing element.

2. In a wire clamping device, the combination with a plurality of members, each member being formed with an internally threaded opening and some of the members having a threaded extension part with a thread for engaging the internal threads and a recessed part thereon, a slidable part located within the members and formed with a wire receiving opening, a portion of the slidable part having a portion to receive a spring, and a shoulder on the slidable part, one end of which spring engages the shoulder part and a recessed part of said threaded extension for moving the slidable part in one direction yet permitting the wire to be moved in the opposite direction and means in the slidable part which automatically grips the wire.

3. A wire clamping device comprising a member having an opening through the same, a cone shaped sleeve secured in the opening, a slidable part in the sleeve and formed with a wire receiving opening, and other openings to receive spherical balls which project into the wire receiving opening, and engage the cone shaped part of the sleeve, means to permit a wire to freely pass through the slidable part in one direction and to force the balls of the slidable part against the cone shaped part and the balls against the wire to clamp the same when the wire is moved in the opposite direction.

4. In a wire clamping device, the combination with an internally threaded member, a sleeve, means for fixedly securing the sleeve in the said member, a second internally threaded member having a threaded extension part for attaching the said second member to the first mentioned member, the threaded extension part having a recess to receive one end of a spring, a slidable member in the sleeve to receive the wire to be clamped, the other end of the spring engaging the slidable member, cooperating means between the wire and the sleeve for permitting the wire to move freely in one direction through the slidable member, but will grip the wire when it is moved in the opposite direction, said spring serving to move slidable member for actuating the wire gripping means.

5. In a wire clamping device, the combination with an internally threaded member, a sleeve, means for fixedly securing the sleeve in the said member, a second internally threaded member having a threaded extension part for attaching the said second member to the first mentioned member, the threaded extension part having a recess to receive one end of a spring, a slidable member in the sleeve to receive the wire to be clamped, the other end of the spring engaging the slidable member, cooperating means between the wire and the sleeve for permitting the wire to move freely in one direction through the slidable member, but will grip the wire when it is moved in the opposite direction, said spring serving to move slidable member for actuating the wire gripping means, and the slidable member being located in the sleeve and the said extension part.

WILLIAM GAMACHE.
ARTHUR J. BEAUDRY.